United States Patent [19]

Kawamura

[11] Patent Number: 5,025,765
[45] Date of Patent: Jun. 25, 1991

[54] HEAT-INSULATED FOUR-CYCLE ENGINE WITH PRECHAMBER

[75] Inventor: Hideo Kawamura, Samukawa, Japan

[73] Assignee: Isuzu Ceramics Research Institute Co. Ltd., Kanagawa, Japan

[21] Appl. No.: 514,842

[22] Filed: Apr. 26, 1990

[30] Foreign Application Priority Data

Apr. 26, 1989 [JP] Japan .................................. 1-106582
May 24, 1989 [JP] Japan .................................. 1-130325

[51] Int. Cl.$^5$ ........................ F02B 19/04; F02B 25/04
[52] U.S. Cl. ..................................... 123/254; 123/76; 123/270; 123/290; 123/668
[58] Field of Search ............... 123/254, 262, 269, 270, 123/290, 289, 668, 76

[56] References Cited

U.S. PATENT DOCUMENTS

| | | | |
|---|---|---|---|
| 2,422,364 | 6/1947 | Osborn | 123/76 |
| 2,658,487 | 11/1953 | Basabe | 123/262 |
| 3,408,995 | 11/1968 | Johnson | 123/668 |
| 4,236,490 | 12/1980 | Correll | 123/260 |
| 4,511,612 | 4/1985 | Hüther et al. | 123/270 |
| 4,872,433 | 10/1989 | Paul et al. | 123/262 |

FOREIGN PATENT DOCUMENTS

| | | |
|---|---|---|
| 0352058 | 1/1990 | European Pat. Off. . |
| 3149500 | 6/1983 | Fed. Rep. of Germany . |
| 1529533 | 6/1968 | France . |
| 350327 | 6/1931 | United Kingdom .................. 123/76 |
| 397840 | 8/1933 | United Kingdom ................ 123/254 |

*Primary Examiner*—Andrew M. Dolinar
*Attorney, Agent, or Firm*—Staas & Halsey

[57] ABSTRACT

A heat-insulated four-cycle engine includes a heat-insulated main combustion chamber, a prechamber having an ejection port communicating with the main combustion chamber and associated with an exhaust valve, a projection mounted on the piston head surface of a piston and movable into the ejection port in the vicinity of the top dead center, a recess defined in the piston head surface around the projection, and intake ports defined in the cylindrical wall of a cylinder which defines the main combustion chamber. Combustion gases produced as a result of combustion of fuel in the prechamber are held in the prechamber by the projection in a high-temperature condition for a certain period of time. Thereafter, as the piston is lowered from the top dead center, the combustion gases are discharged from the prechamber into the main combustion chamber, thus lowering the pressure in the prechamber. Therefore, the temperature in the prechamber is lowered, and the amount of NOx, HC, CO, and black smoke which are emitted is also reduced. Since the intake and exhaust ports are isolated from each other, the amount of heat transferred from the exhaust port to the intake port is small. As a result, the temperature of the region around the intake ports is not increased, and the intake efficiency is not lowered. Inasmuch as the engine has an adiabatic expansion stroke between exhaust and intake strokes, the temperature of the wall of the combustion chamber is lowered when the fuel is ignited, resulting in less knocking possibility.

7 Claims, 4 Drawing Sheets

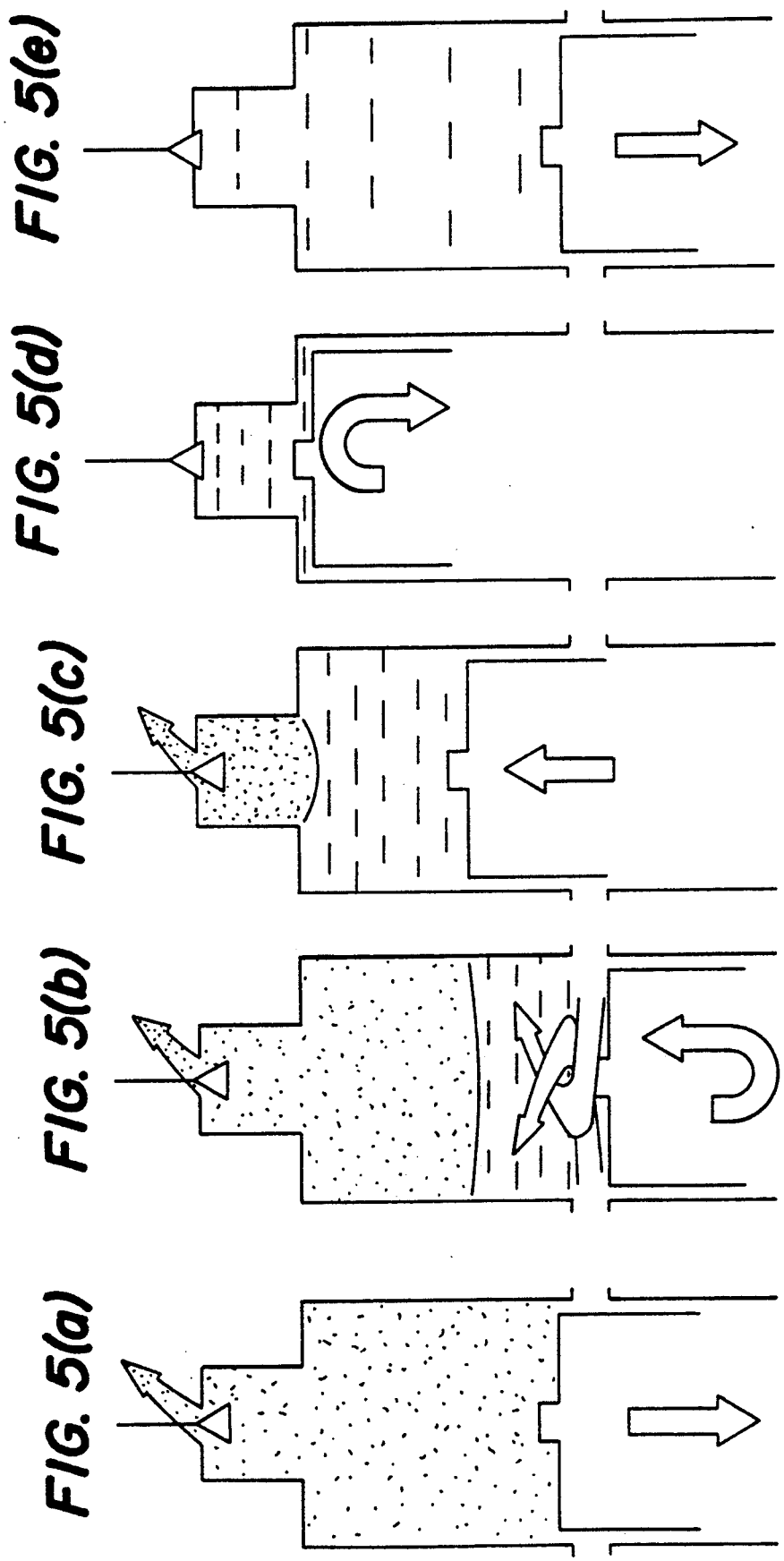

HEAT-INSULATED FOUR-CYCLE ENGINE WITH PRECHAMBER

BACKGROUND OF THE INVENTION

1. Field of the Invention

The present invention relates to a heat-insulated four-cycle engine with a prechamber, the engine having a combustion chamber which is heat-insulated from the exterior of the engine and also having intake ports and a discharge port which are isolated from each other.

2. Description of the Prior Art

Conventional engines produce mechanical energy, i.e., an engine output, which is about ⅓ of the heat energy generated by combustion of fuel in combustion chambers. The rest of the generated heat energy, i.e., about ⅔ of the heat energy, is either transferred to the exterior through the engine itself or discharged out of the engine together with the exhaust gases. This heat energy is not added to the engine output, but simply wasted.

Various heat-insulated engines have been proposed to increase the engine efficiency. In the proposed engines, the inner wall surface of a combustion chamber is covered with a heat insulating material such as ceramic which has a low heat conductivity and high heat resistance, so that the combustion chamber is heat-insulated from the exterior of the engine. With this arrangement, the amount of heat energy discharged with the exhaust gases is increased, and the increased heat energy of the exhaust gases is recovered by a turbocharger or the like, for thereby effectively utilizing the energy of the exhaust gases.

The temperature in the combustion chambers of the heat-insulated engines is higher than the temperature in the combustion chambers of ordinary engines. Therefore, unless the air-fuel ratio were varied, the amount of nitrogen oxides (NOx) contained as an air pollutant in the exhaust gases would be increased. If the amount of fuel to be supplied to the engine were increased for the reduction of the NOx, then hydrocarbons (HC), carbon monoxide (CO), and black smoke would be discharged in increased quantities.

Since the exhaust gases are of a high temperature, the region around the exhaust port is heated to a high temperature. If the intake and exhaust ports are located closely to each other, the heat energy from the region around the exhaust port is transferred to the region around the intake port, resulting in a rise in the temperature of the region around the intake port. Intake air which is supplied through the intake port is then heated and expanded before it is introduced into the cylinder, and hence the actual mass of the drawn air is reduced. As a result, the engine output is lowered.

Another problem is that the wall surface of the combustion chamber is heated to a high temperature, tending to ignite the fuel earlier than the normal ignition timing, so that the engine suffers knocking.

SUMMARY OF THE INVENTION

In view of the aforesaid drawbacks of the conventional heat-insulated engines, it is an object of the present invention to provide a heat-insulated four-cycle engine with a prechamber, which will reduce the discharged amount of NOx, HC, CO, and black smoke, has intake and exhaust ports heat-insulated from each other to block heat transfer from the exhaust port to the intake ports, and prevents the wall surface of a combustion chamber from being heated to a high temperature when the supplied fuel is ignited.

According to the present invention, there is provided a heat-insulated four-cycle engine comprising a main combustion chamber made of heat insulating material, a prechamber made of a heat insulating material, for holding, as swirls, swirling intake air introduced from the main combustion chamber, the prechamber having an exhaust port, an exhaust valve for opening and closing the exhaust port, an ejection port communicating between the prechamber and the main combustion chamber, for introducing the swirling intake air from the main combustion chamber into the prechamber, a piston reciprocally disposed in the main combustion chamber and having a piston head surface, a projection mounted on the piston head surface and movable into the ejection port to reduce the opening area of the ejection port when the piston reaches a position near the top dead center thereof, the piston head surface having a recess defined around the projection, and an intake port defined in a circumferential surface of the main combustion chamber and positioned such that the intake port positionally corresponds to the piston head surface when the piston reaches a position near the bottom dead center thereof.

After fuel is ignited, the produced combustion gases are kept in the prechamber in a high-temperature condition for a certain period of time. As the combustion progresses until the ratio of fuel to air is lowered, the temperature in the combustion chamber is quickly lowered, thus reducing NOx, HC, CO, and black smoke emissions.

The intake and exhaust ports are thermally isolated to prevent heat transfer from occurring from the exhaust port to the intake port. Therefore, the temperature of the intake port is not increased, and the intake efficiency is not lowered. The engine has an adiabatic expansion stroke between exhaust and intake strokes. Therefore, the temperature of the wall of the combustion chamber is lowered when the fuel is ignited, resulting in less knocking possibility. The motor vehicle with the engine according to the present invention can be driven stably.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 5a through 5e are diagrams showing certain strokes of the engine;

DETAILED DESCRIPTION OF THE PREFERRED EMBODIMENT

Figure 1:
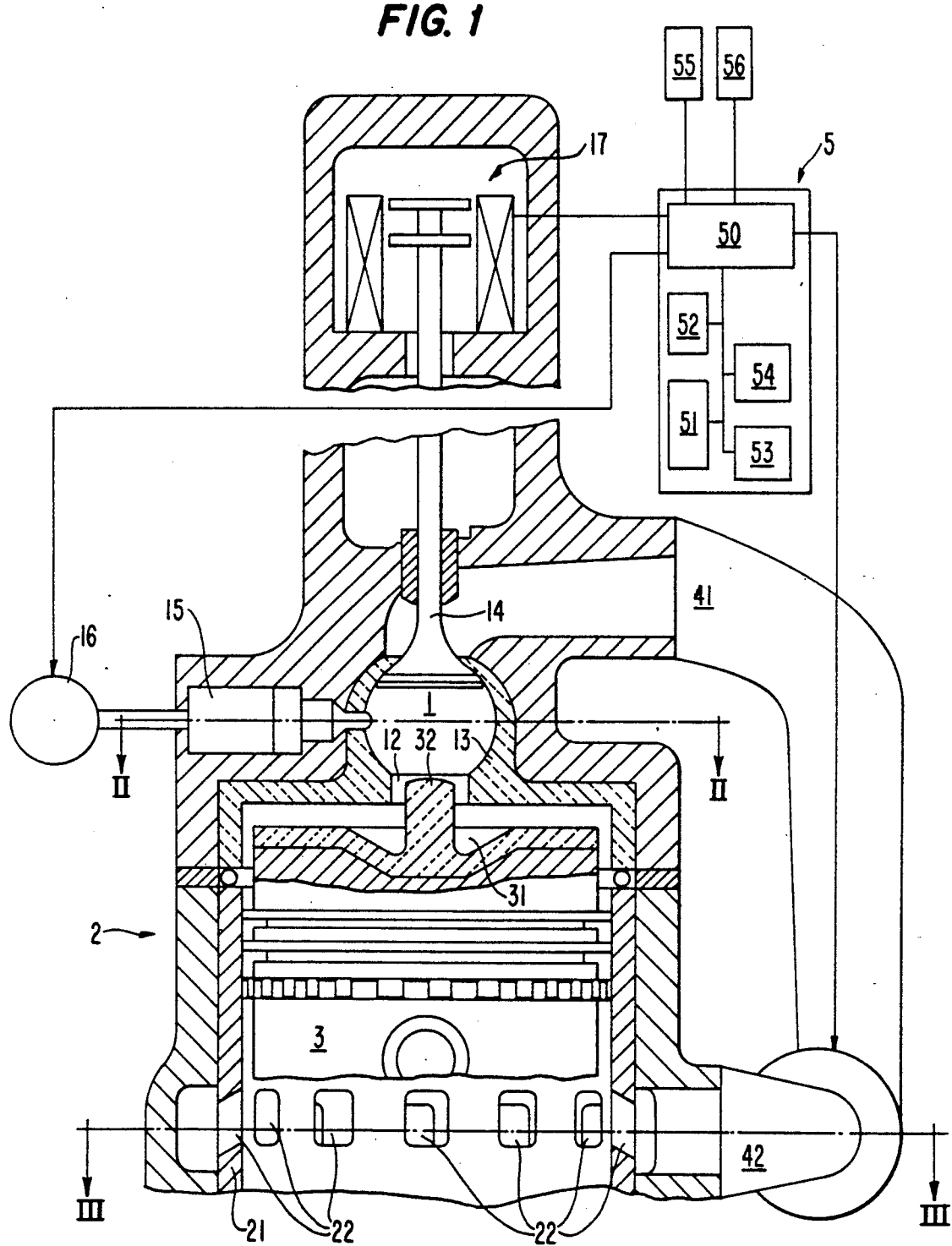
FIG. 1 is a fragmentary cross-sectional view, partly in block form, of a heat-insulated four-cycle engine with a prechamber according to the present invention.
Figure 2:
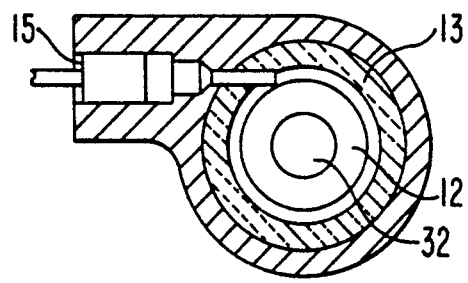
FIG. 2 is a cross-sectional view taken along line II—II of FIG. 1.
Figure 3:
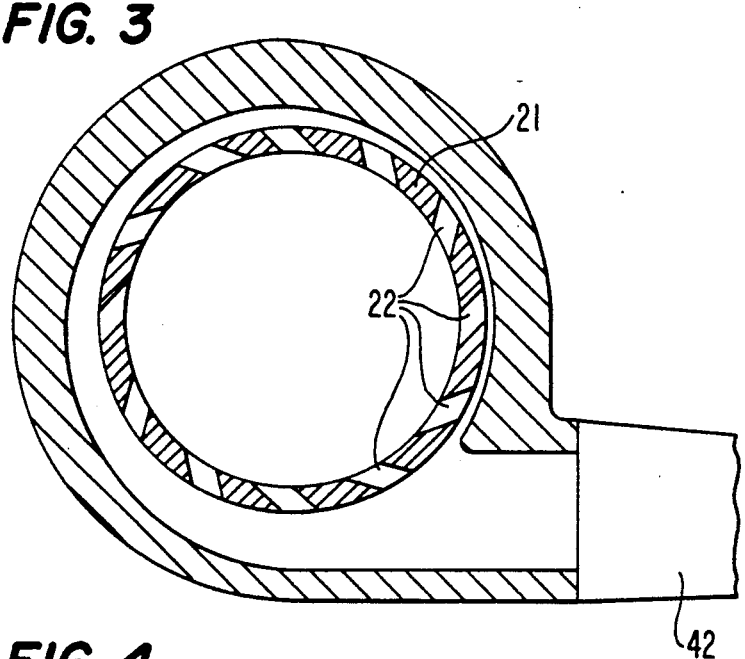
FIG. 3 is a cross-sectional view taken along line III—III of FIG. 1.

FIGS. 1, 2, and 3 show structural details of a heat-insulated four-cycle engine with a prechamber according to the present invention.

The engine has a prechamber 1 having an inner wall covered with a sleeve 13 which is made of a heat-resistant heat insulating material such as ceramic. The prechamber 1 also has an ejection port 12 communicating with a main combustion chamber and an exhaust port for discharging exhaust gases from the main combustion chamber and the prechamber 1.

The exhaust port can be opened and closed by an exhaust valve 14 disposed in the exhaust port. An injection nozzle 15 for injecting fuel into the prechamber 1 is disposed laterally of the prechamber 1, and is connected to a fuel pump 16 which supplies fuel under pressure to the injection nozzle 15.

The exhaust valve 14 is opened and closed by a valve actuator 17 which is disposed around the shank of the exhaust valve 14. In the illustrated embodiment, the valve actuator 17 comprises a permanent magnet connected to the shank of the exhaust valve 14 and an electromagnet disposed in an engine body. The exhaust valve 14 can therefore be actuated by electromagnetic forces produced by the permanent magnet and the electromagnet. However, the exhaust valve 14 may be opened and closed by a camshaft.

The main combustion chamber is defined in a cylinder 2 which is disposed below and held in communication with the prechamber 1. The cylinder 2 has an inner wall covered with a cylinder sleeve 21 which is made of a heat-resistant heat insulating material such as ceramic.

The cylinder sleeve 21 has a circumferential array of intake ports 22 defined in a lower portion thereof. The intake ports 22 are inclined to the axis of the cylinder sleeve 21 for introducing a swirl of intake air from the intake ports 22 into the cylinder 2.

A piston 3 is reciprocally disposed in the cylinder 2. The piston 3 has a recess 31 defined centrally in the piston head surface thereof which faces the prechamber 1 and a projection 32 extending from the central bottom of the recess 31 toward the ejection port 12. When the piston 3 reaches a position near the top dead center of its stroke, the projection 32 enters the ejection port 12, reducing the opening area of the ejection port 12. The projection 32, the surface defining the recess 31, and the piston head surface are made of a heat-resistant heat insulating material such as ceramic.

Exhaust gases discharged from the exhaust port are led through an exhaust pipe 41 to the turbine of a turbocharger 4. The turbocharger 4 has a rotatable shaft to which an electric motor (not shown) is connected. When the motor is energized by electric power supplied from an external power supply, it can rotate the rotatable shaft of the turbocharger 4. The compressor of the turbocharger 4 can therefore be rotated by the energy of the exhaust gases applied to the turbine or the electric energy supplied to the motor, for supplying intake air under boost pressure through an intake pipe 42 to the intake ports 22.

The valve actuator 17, the fuel pump 16, and the electric motor of the turbocharger 4 are controlled by signals supplied from an input/output interface 50 of a control unit 5.

To the input/output interface 50, there are connected a rotation sensor 55 for detecting the rotational speed and crankshaft angle of the engine, and an accelerator pedal movement sensor 56 for detecting the amount of depression of the accelerator pedal associated with the engine. Therefore, signals from these sensors 55, 56 are applied to the control unit 5.

The control unit 5 comprises, in addition to the input/output interface 50, a ROM 53 for storing a control program and various tables, a CPU 51 for effecting arithmetic operations under the control of the control program stored in the ROM 53, a RAM 54 for temporarily storing the results of the arithmetic operations and data, and a control memory 52 for controlling the flow of signals in the control unit 5.

Operation of the heat-insulated four-cycle engine thus constructed will be described below.

Figure 4:
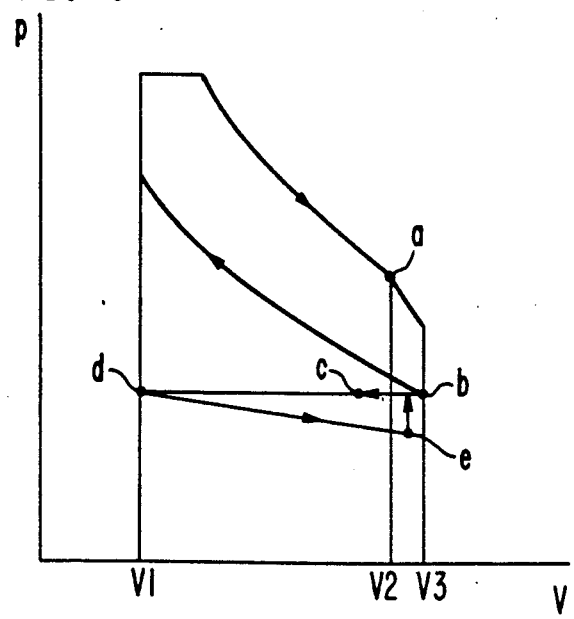
FIG. 4 is a graph showing a pressure vs. volume (p-v) diagram of the engine.

In FIGS. 4 and 5, when the combined volume of the main combustion chamber and the prechamber 1 is increased from a point V1 at the top dead center where the main combustion chamber is compressed to a point V2 immediately prior to the bottom dead center, in the expansion stroke after combustion, the exhaust port is opened to start discharging the exhaust gases.

While the volume is expanded through a condition shown at a in FIG. 5 to a point V3 at the bottom dead center, the pressure in the main combustion chamber and the prechamber 1 quickly drops. Since the intake ports 22 are opened at the bottom dead center shown at b in FIG. 5, intake air supplied under boost pressure is introduced as swirling air flows into the cylinder 2.

The introduced intake air pushes the exhaust gases upwardly to assist in discharging the exhaust gases from the exhaust port. The piston 3 moves upwardly from the bottom dead center, closing the intake ports 22 to stop introducing the intake air. Even at this time, exhaust gases still remain in the cylinder 2. Therefore, the exhaust port remain open as indicated at c in FIG. 5. The exhaust port is continuously open until the piston 3 reaches the top dead center, whereupon the exhaust gases are completely discharged from the cylinder.

Then, the exhaust port is closed at the top dead center V1 as indicated at d in FIG. 5. With the exhaust port closed, the piston 3 is lowered to cause the intake air sealed in the cylinder 2 to be adiabatically expanded. Since the temperature of the intake air is lowered during the adiabatic expansion, the intake air quickly absorbs heat energy from the inner wall of the combustion chamber, thus lowering the temperature of the combustion chamber inner wall.

When the piston 3 moves past a point immediately prior to the bottom dead center V3 as indicated at e in FIG. 5, intake air rapidly flows from the intake ports 22 into the cylinder 2 under the boost pressure and a vacuum developed in the cylinder 2.

Since the intake ports 22 are inclined with respect to the central axis of the cylinder 2 as shown FIG. 3, the introduced intake air swirls at high speed in the cylinder 2.

As the piston 3 moves upwardly, the swirling air flows in the cylinder 2 are moved toward the prechamber 1. Because the diameter of the prechamber 1 is smaller than the diameter of the cylinder 2, the air swirls in the cylinder 2 are accelerated and flow into the prechamber 1.

In the latter half of the compression stroke of the piston 3, the amount of intake air flowing into the prechamber 1 is reduced. However, the projection 32 on the piston head enters the ejection port 12 and narrows its opening area, thereby accelerating the air swirls as they go into the prechamber 1. Accordingly, when the compression stroke ends, air swirls at higher speed are produced in the prechamber 1.

Since the inner wall of the prechamber 1 has already been cooled upon completion of the compression stroke, when fuel is injected from the injection nozzle 15 into the prechamber 1 along the air swirls (see FIG. 2), the injected fuel is combusted in good condition. Then, the piston 3 starts the expansion stroke.

When the fuel is combusted, combustion gases are produced, lowering the piston 3. Upon descent of the piston 3, the opening area of the ejection port 12 which has been narrowed by the projection 32 is increased, thereby allowing the combustion gases to be spread quickly into the cylinder 2.

The timing with which the exhaust valve 14 is opened and closed in each of the above strokes, the amount of fuel injected by the injection nozzle 15, the timing with which the fuel is injected, and the amount of intake air introduced into the cylinder 2 are calculated and determined by the control unit 5 based on the detected signals from the rotation sensor 55 and the accelerator movement sensor 56.

The manner in which the combustion gases flow in the prechamber 1 will be described in detail with reference to FIGS. 6(a) through 6(c).

Figure 6A:
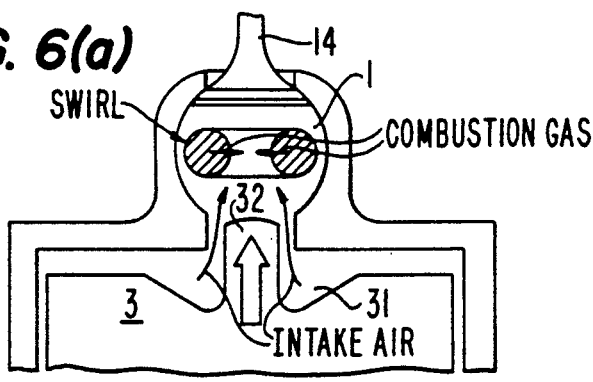
FIGS. 6(a) through 6(c) are schematic views showing how exhaust gases flow in the prechamber.

FIG. 6(a) shows the condition immediately before the piston 3 reaches the top dead center. FIG. 6(b) shows the condition immediately after the piston 3 reaches the top dead center. FIG. 6(c) shows the condition in which the piston 3 is descending.

As shown in FIG. 6(a), the combustion gases which are produced in the swirls in the prechamber 1 after the fuel is ignited are expanded, and have a lower specific gravity than the unburned fuel. Therefore, the combustion gases are directed toward the central area of the swirls due to the centrifugally separating action of the swirls.

Inasmuch as the central area of the swirls is lower in pressure than the peripheral area thereof, air in the recess 31 is drawn into the central area of the swirls from the ejection port 12 which is narrowed by the projection 32, thus accelerating the combustion in the central area of the swirls. The air mass or pocket corresponding to the amount of air thus introduced into the prechamber 1, i.e., the recess 31 in the cylinder head, is effective to suppress the generation of black smoke.

Figure 6B:
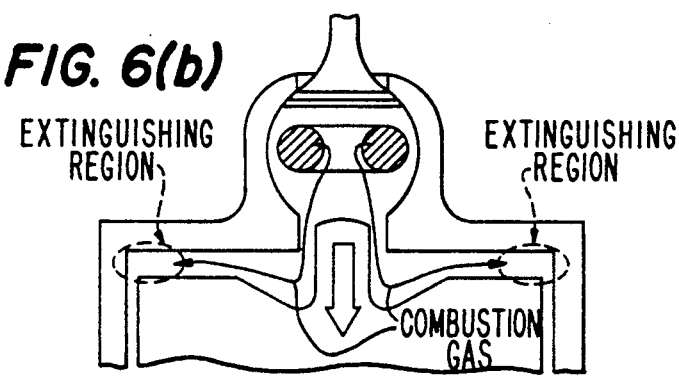

Then, as shown in FIG. 6(b), when the piston 3 moves past the top dead center and starts being lowered, the combustion gases in the central area of the swirls is discharged toward the piston 2 in the main combustion chamber. The combustion gases flow into the recess 31 as a high-speed flow due to the nozzle action of the ejection port 12 which is narrowed by the projection 32. The combustion gases are then mixed with air remaining in the recess 31, whereupon any unburned components in the combustion gases are combusted, maintaining the combustion gases in a high-temperature condition.

Extinguishing regions, where the combustion gases would otherwise be cooled and extinguished by the inner wall of the cylinder as with the conventional engines, are therefore also kept in the high-temperature condition.

Figure 6C:
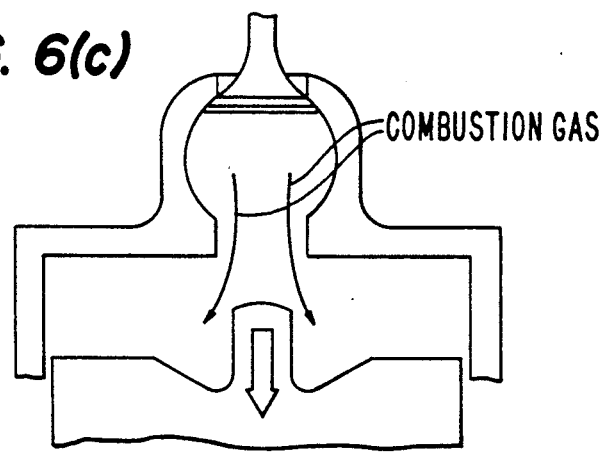

When the piston 3 is further lowered and the projection 32 leaves the ejection port 12, as shown in FIG. 6(c), the ejection port 12 is opened, permitting the combustion gases to be spread and expanded from the prechamber 1 into the cylinder 2. Therefore, the temperature of the combustion gases is rapidly lowered.

The relationship between the temperature in the combustion chamber and exhaust emissions will be described with reference to FIG. 7.

Figure 7:
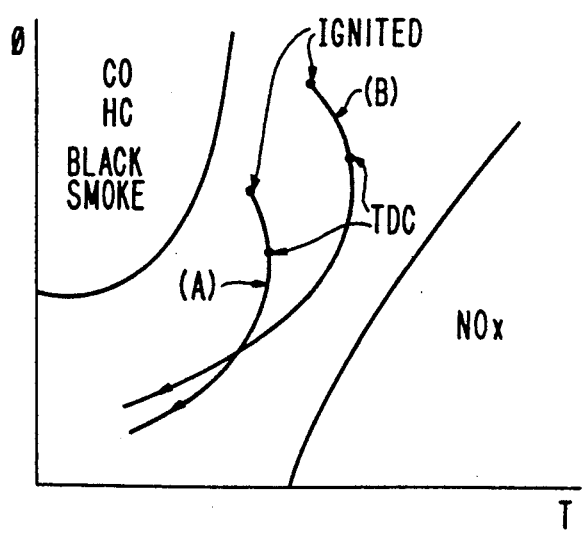
FIG. 7 is a diagram showing the manner in which the temperature in the combustion chamber and the ratio of fuel contained in an air-fuel mixture vary in the combustion stroke.

The graph of FIG. 7 has a vertical axis representing the ratio $\phi$ of fuel in the air-fuel mixture, and a horizontal axis representing the temperature T. HC, CO, and black smoke are produced in an upper left range, whereas NOx is produced in a lower right range. The curve A indicates how the exhaust emissions vary with temperature in a conventional engine whose combustion chamber is not heat-insulated, and the curve B shows how the exhaust emissions vary with temperature in the engine according to the present invention.

Since the engine of the present invention is a heat-insulated engine, the curve B is on a higher-temperature side than the curve A. If the fuel ratio $\phi$ of the engine of the invention were the same as that of the conventional engine, then the curve B would enter the NOx region. Therefore, the fuel ratio $\phi$ is increased to prevent the curve B from entering the NOx region.

If only the fuel ratio $\phi$ were increased, then the curve B would enter the region where HC, CO, and black smoke are produced. The curve B can be prevented from entering this region by keeping the high-temperature condition after the ignition for a longer period of time than with the conventional engine and by lowering the temperature quickly after the fuel ratio is reduced.

In this manner, the curve B is prevented from entering both the regions where HC, CO and black smoke and NOx are produced.

Although a certain preferred embodiment has been shown and described, it should be understood that many changes and modifications may be made therein without departing from the scope of the appended claims.

What is claimed is:

1. A heat-insulated four-cycle engine comprising:
   a main combustion chamber made of a heat insulating material;
   a prechamber made of a heat insulating material, for holding, as swirls, swirling intake air introduced from said main combustion chamber, said prechamber having an exhaust port;
   an exhaust valve for opening and closing said exhaust port;
   an ejection port communicating between said prechamber and said main combustion chamber, for introducing the swirling intake air from said main combustion chamber into said prechamber;
   a piston reciprocally disposed in said main combustion chamber and having a piston head surface;
   a projection mounted on said piston head surface and movable into said ejection port to reduce the opening area of the ejection port when said piston reaches a position near the top dead center thereof, said piston head surface having a recess defined around said projection; and
   an intake port defined in a circumferential surface of said main combustion chamber and positioned such that the intake port positionally corresponds to said piston head surface when said piston reaches a position near the bottom dead center thereof.

2. A heat-insulated four-cycle engine according to claim 1, wherein said ejection port has a central axis aligned with the central axis about which the swirls held in said prechamber swirl.

3. A heat-insulated four-cycle engine according to claim 1, further comprising supercharging means drivable by exhaust gases discharged from said exhaust port, for supplying intake air under pressure from said intake port into said main combustion chamber.

4. A heat-insulated four-cycle engine according to claim 3, further including an electric motor for driving said supercharging means.

5. A heat-insulated four-cycle engine according to claim 1, wherein said piston head surface, a surface defining said recess, and said projection are made of a heat insulating material.

6. A heat-insulated four-cycle engine according to claim 1 or 5, wherein said insulating material comprises a ceramic material.

7. A heat-insulated four-cycle engine according to claim 1, further including means for electromagnetically driving said exhaust valve to open and close said exhaust port.

* * * * *